3,194,641
METHOD OF REMOVING SULFATES FROM CRYOLITE CONTAINING THE SAME
Arthur Gross and Heinz Ringelmann, Lunen, Westphalia, Germany, assignors to Vereinigte Aluminium-Werke, Bonn, Germany
No Drawing. Filed Nov. 29, 1961, Ser. No. 155,898
Claims priority, application Germany, Nov. 29, 1960, V 19,720
14 Claims. (Cl. 23—312)

Cryolite-containing residues such as accrue for instance in the electrolytic production of aluminum or which may also accrue in other industrial processes wherein a fluorine-containing waste product is formed, may be regenerated by treating such fluorine-containing waste products with sodium hydroxide and reacting the thus-formed solution with sodium fluoride-containing liquids obtained, for instance, from the gas washer of the aluminum producing electrolytic installation and containing carbon dioxide. The carbon dioxide will cause precipitation of cryolite. However, the thus regenerated or produced "artificial" cryolite contains considerable quantities generally about 7% of sodium sulfate which originates from the sulfur dioxide content of the waste gases which pass through the gas washer.

The recovery of cryolite from waste products is described for instance in U.S. Patent No. 1,871,723 to Morrow.

Up to now it was considered more or less unavoidable that regenerated cryolite produced in the above described manner will contain such considerable proportion of sodium sulfate.

In this connection, it was interesting to note that the sulfate content of the thus produced cryolite, while generally of the magnitude of about 7%, will not exceed an upper limit of between about 8 and 10% sodium sulfate —even when an excess of sulfate is available due to the use of wash liquids which contain a large proportion thereof. On the other hand, it was not possible up to now, or only possible to a very limited extent, to wash out sodium sulfate from cryolite produced in the above discussed manner. These two facts, namely that the sulfate is hardly removable from the cryolite and that the sodium sulfate content of the cryolite will not exceed an upper limit of between about 8 and 10% indicate that such sodium sulfate is more or less firmly bound to the crystalline structure of the cryolite during formation or regeneration of the same, whereby the firmness of the bond between sodium sulfate and cryolite will depend to some extent on the specific method employed and the conditions prevailing during regeneration of the cryolite.

Up to now, it has been assumed to be unavoidable that regenerated cryolite produced as broadly described above, or as for instance disclosed in the above-mentioned U.S. patent, will contain a significant percentage of sulfate.

However, the use of sulfate-containing cryolite in the electrolysis of fused electrolytes for the production of aluminum is connected with certain disadvantages such as larger melting losses, an increased consumption of aluminum fluoride, reduced current yield, increased consumption of anode mass, as well as formation of sulfur dioxide gas which constitutes at least an annoyance and possibly a health hazard for the operating crew of the aluminum producing cells.

It is therefore an object of the present invention to overcome the above discussed difficulties in the use of regenerated cryolite or of any cryolite containing substantial quantities of sulfate.

It is another object of the present invention to provide a method for reducing the sulfate content of cryolite.

It is yet another object of the present invention to provide a method for the reduction of the sulfate content of cryolite originally containing the same, which method can be carried out in a simple and economical manner.

Other objects and advantages of the present invention will become apparent from a further reading of the description and of the appended claims.

With the above and other objects in view, the present invention contemplates a method of removing sulfate from cryolite containing the same, comprising the steps of heating the sulfate-containing cryolite to a temperature above 100° C. thereby increasing the solubility of the sulfate contained in the cryolite, and treating the cryolite with water so as to dissolve at least a portion of the sulfate content thereof.

Surprisingly, it has been found according to the present invention that the sulfate content of such cryolite can be substantially washed or leached out with water provided that the cryolite is heated prior or during such washing process to temperatures exceeding 100° C. and preferably of between about 180 and 220° C.

Such heat treatment of the sulfate-containing cryolite can be carried out by filtering off the precipitated cryolite and introducing the still moist cryolite into a dryer, for instance a rotary dryer wherein the cryolite is heated to the above mentioned temperature exceeding 100° C. and preferably to between 180 and 220° C.

On the other hand, it is also possible to introduce the aqueous suspension of precipitated cryolite into a steam heated autoclave provided with suitable stirring equipment and to heat the suspension in such autoclave to the above mentioned elevated temperatures. In the latter case, it is advantageous, prior to introduction into the autoclave, to subject the precipitated cryolite to several washing steps with water, always decanting the supernatant water prior to starting the next washing step, in order to recover in such wash waters the free alkaline and sodium fluoride content thereof.

The thus purified aqueous cryolite suspension which may have a concentration of up to about 500 grams of cryolite per liter of suspension is then pumped into the autoclave and heated therein for a relatively short period of time. Thereafter, the thus treated cryolite is filtered off and washed on the filter in conventional manner.

The initial composition of the sulfate-containing cryolite may vary within rather broad ranges, depending on the composition of the initial fluor-containing waste products which are to be regenerated and depending on the specific process followed in the formation or regeneration of the cryolite, for instance depending on the concentration, temperature, length of reaction time and the like. Broadly, the sulfate-containing cryolite which is treated according to the present invention so as to reduce its sulfate content may have a composition such as indicated in Table I.

TABLE I

| | Percent |
|---|---|
| Na | 25–34 |
| F | 45–50 |
| Al | 11–16 |
| $Fe_2O_3$ | 0–0.3 |
| $SiO_2$ | 0–0.3 |
| CaO | 0–.10 |
| $SO_4$ | 4–7 |
| $H_2O$ | 0–1.1 |

The following examples will show how, according to the present invention, sodium sulfate can be removed from the recorded cryolite containing the same or being bound thereto, by heating the product to a temperature higher than 100° C., whereby either the dry product may be heated and thereafter leached with relatively cool water, or an aqueous suspension of the recovered cryolite residue may be heated to above 100° C. and then filtered.

The examples are given as illustrative only without limiting the invention to the specific details thereof.

*Example I*

Cathode linings taken from electrolytic cells for the production of aluminum are comminuted to particle sizes of up to 15 mm. and then are leached with a 3% aqueous sodium hydroxide solution. 16 cubic meters of the thus formed solution are then mixed with 29 cubic meters of sodium fluoride-containing wash waters accruing in the gas washer of the plant for the electrolytic production of aluminum. The mixing vessel, preferably, will have a capacity of at least 60 cubic meters.

The sodium hydroxide solution contains 30.0 grams per liter of dissolved cryolite and 5.2 grams per liter of dissolved aluminum oxide. The gas washer liquid contains 17.4 grams per liter of sodium fluoride and 32.4 grams per liter of sodium sulfate. Prior to mixing, both solutions are heated to 85° C. After mixing the two solutions, a continuous stream of carbon dioxide produced in a lime kiln is introduced for a period of three and a half hours. The progress of the reaction is controlled by successively taking samples, precipitating the sodium carbonate contained in the samples with barium chloride, and determining the point at which the reaction of the thus-treated solution will turn from an alkaline to slightly acidic reaction. Phenolphthalein is used as an indicator for this purpose, and upon reaching the turning point the introduction of carbon dioxide is terminated. By thus treating the mixture with carbon dioxide, 610 kg. of solid cryolite are precipitated. The composition of the thus formed cryolite is as follows:

| | Percent | | Percent |
|---|---|---|---|
| Na | 31.7 | CaO | 0.60 |
| F | 48.6 | $Fe_2O_3$ | 0.04 |
| Al | 12.5 | $SiO_2$ | 0.17 |
| $SO_4$ | 5.48 | $H_2O$ | 0.98 |

About one half of the thus precipitated cryolite is filtered off, washed with hot water and then dried at a temperature of 210° C. for 2 hours in order to increase the solubility of the sulfate. The thus obtained 290 kg. of sulfate-containing cryolite are vigorously stirred for half an hour in 1 cubic meter of water having a temperature of 60° C., thereafter filtered off, washed on the filter and dried at 110° C. In this manner 270 kg. of purified cryolite are obtained having the following composition:

| | Percent | | Percent |
|---|---|---|---|
| Na | 31.4 | CaO | 0.64 |
| F | 52.2 | $Fe_2O_3$ | 0.04 |
| Al | 13.4 | $SiO_2$ | 0.17 |
| $SO_4$ | 0.42 | $H_2O$ | 1.05 |

The balance of the cryolite suspension which has been obtained by precipitation with carbon dioxide is twice stirred with water and subsequently decanted, and thereafter a 50% aqueous suspension of the thus-washed cryolite is pumped into an autoclave and heated therein for 1 hour at a temperature of 220° C. Heating is carried out by passing steam through coils located in the autoclave. After reducing the pressure in the autoclave to atmospheric pressure, the cryolite is filtered off, washed on the filter and then dried in 110° C.

In this manner, 295 kg. of cryolite of the following composition are obtained:

| | Percent | | Percent |
|---|---|---|---|
| Na | 31.4 | CaO | 0.64 |
| F | 52.2 | $Fe_2O_3$ | 0.04 |
| Al | 13.4 | $SiO_2$ | 0.17 |
| $SO_4$ | 0.29 | $H_2O$ | 1.06 |

The two above described methods for reducing the sulfate content of the cryolite are of approximately equal effectiveness. However, the first described method requires two filtering and drying steps and thus it will take relatively long to carry out this method while, on the other hand, the last described method requires an autoclave in which the suspension can be heated to 220° C.

*Example II*

5000 kg. of a sulfate-containing cryolite are heated in a rotary furnace to a temperature of between 180° C. and 190° C. The composition of the thus heated sulfate-containing cryolite is as follows:

| | Percent | | Percent |
|---|---|---|---|
| Na | 32.3 | CaO | 0.90 |
| F | 48.3 | $Fe_2O_3$ | 0.04 |
| Al | 12.2 | $SiO_2$ | 0.25 |
| $SO_4$ | 5.35 | $H_2O$ | 0.64 |

The cryolite is then suspended in 5000 liters water in a steam heated container provided with suitable stirring equipment and the thus formed suspension is stirred for about 1 hour at a temperature of between 90–95° C. Thereafter, the sulfate-containing aqueous solution is separated from the cryolite by filtration. The cryolite is washed on the filter and then dried.

In this manner, a cryolite of greatly reduced sulfate content is obtained, having the following composition:

| | Percent | | Percent |
|---|---|---|---|
| Na | 29.9 | CaO | 0.86 |
| F | 52.2 | $Fe_2O_3$ | 0.03 |
| Al | 12.4 | $SiO_2$ | 0.25 |
| $SO_4$ | 0.53 | $H_2O$ | 0.60 |

It can be seen that about 90% of the initial sulfate content were removed by the above described treatment.

Samples of the sulfate-containing cryolite described above were dried under closely controlled laboratory conditions and subsequently leached at about 95° C. Drying temperatures from 100° C. to 300° C. were applied and the following Table II will show the residual sulfate content of the treated cryolite and its dependence on the temperature to which the cryolite had been heated during the drying step preceding the leaching of the material with hot water.

TABLE II

| Drying temperature, °C.: | Residual sulfate content after leaching, percent $SO_4$ |
|---|---|
| 100 | 5.21 |
| 110 | 4.12 |
| 120 | 3.21 |
| 140 | 2.47 |
| 160 | 1.89 |
| 180 | 0.72 |
| 200 | 0.27 |
| 220 | --- |
| 300 | 0.12 |

*Example III*

10 cubic meters of cryolite suspension containing about 500 g. of solid material per liter and originating from the reaction of a mixture of sodium fluoride-containing wash water and aluminum hydroxide-containing alkaline solution with carbon dioxide gas are placed in a decanting vessel and are washed and decanted three times with 20 cubic meters of fresh water in order to substantially completely wash out the soluble alkali and fluoride contained in the suspension of cryolite. The wash waters which are obtained by decantation are then reintroduced into the gas washer of the electrolytic aluminum producing plant.

The thus purified 50% cryolite suspension is pumped into an autoclave and heated therein to between about 180 and 220° C. The temperature is maintained at such level for about one half hour. Thereafter, pressure is reduced to about 4 atmospheres absolute pressure and this residual pressure is employed to convey the contents of the autoclave into a container provided with suitable stirring equipment. The suspension is then filtered, the cryolite is washed on the filter and thereafter dried.

Table III below compares the composition of the cryolite prior and after the above described treatment.

TABLE III

| Crude Cryolite | Treated Cryolite |
|---|---|
| 26.3% Na | 25.0% Na |
| 45.6% F | 48.5% F |
| 15.5% Al | 16.5% Al |
| 6.17% $SO_4$ | 0.18% $SO_4$ |
| 0.61% CaO | 0.65% CaO |
| 0.25% $Fe_2O_3$ | 0.27% $Fe_2O_3$ |
| 0.14% $SiO_2$ | 0.15% $SiO_2$ |
| 0.60% $H_2O$ | 0.57% $H_2O$ |

It will be noted that in the above described manner about 97% of the sulfate content of the crude cryolite were removed.

The process of Example III was then repeated under laboratory conditions at varying autoclave temperatures and Table IV below illustrates the dependency of the degree of sulfate removal on the temperature maintained during the heating treatment of the cryolite suspension.

TABLE IV

| Autoclave temperature, °C.: | Residual sulfate content, percent $SO_4$ |
|---|---|
| 100 | 6.11 |
| 110 | 4.02 |
| 120 | 3.19 |
| 140 | 1.95 |
| 160 | 0.35 |
| 180 | 0.15 |
| 200 | 0.25 |
| 220 | 0.09 |
| 250 | 0.13 |

It will be noted that the above described analytical results show slight deviations from what could be theoretically expected. For instance, in one case, the residual sulfate content at 200° C. appears somewhat higher than at 180° C. However, these slight deviations are not of any substantial importance, inasmuch as for use in the electrolytic production of aluminum it is primarily desirable to keep the sulfate content of the cryolite from exceeding 0.5%. It must be remembered that the materials involved in the process of the present invention are not purified laboratory preparations but products obtained on a large scale by the regeneration of waste products accruing in the working up of natural substances. Thus, several minor variables in the composition of the original raw product, as well as in the conditions under which the process is carried out, cannot be fully avoided and will be reflected in such minor deviations from the expected direct relationship of increase in temperature to reduction in residual sulfate content.

As pointed out further above, the sodium sulfate may be bound to the cryolite with a varying degree of firmness, depending on the conditions under which the cryolite is produced, such as the type and quantity of impurities in the starting solution, temperatures, concentrations and length of reaction time. Corresponding thereto, there will be minor variations in the temperatures which are required to transform the sulfate into a fully or to a large extent water soluble form. In other words, it is possible that a certain lot of cryolite can be freed more completely of sulfate at a somewhat lower temperature, than another lot at a somewhat higher temperature. These minor deviations can also be found in the analytical results shown hereinabove which indicate certain variations in the degree of firmness by which the sodium sulfate is bound to the cryolite.

It has been found that cryolite containing up to 0.5% sodium sulfate may be used in the electrolytic production of aluminum without causing major difficulties of the type described in the introductory portion of the specification. It is therefore preferred, according to the present invention, to carry out the heat treatment at temperatures of between 180 and 220° C., since within this temperature range the solubility of the sulfate will be sufficiently increased to assure a residual sulfate content which will be safely below 0.5%. However, it is of course within the scope of the present invention to carry out the above described method so as to obtain any desired degree of reduction in the bound sulfur content of the thus treated cryolite.

Without further analysis, the foregoing will so fully reveal the gist of the present invention that others can by applying current kowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a method of removing sodium sulfate from cryolite containing the same, the steps of heating said sodium sulfate-containing cryolite to a temperature above 100° C.; and leaching the thus heated cryolite with an aqueuos liquid so as to dissolve at least a portion of said sulfate thus obtaining a cryolite of reduced sulfate content.

2. A method of removing sodium sulfate from cryolite containing the same, comprising the steps of heating said sodium sulfate-containing cryolite to a temperature above 100° C. thereby increasing the solubility of the sulfate contained in said cryolite; and treating said cryolite with water so as to dissolve at least a portion of the sulfate content thereof.

3. A method of removing sodium sulfate from cryolite containing the same, comprising the steps of heating said sodium sulfate-containing cryolite to a temperature between about 180 and 220° C. thereby increasing the solubility of the sulfate contained in said cryolite; and treating said cryolite with water so as to dissolve at least a portion of the sulfate content thereof.

4. A method for removing from cryolite sodium sulfate bound thereto, comprising the steps of heating substantially dry sodium sulfate-containing cryolite to a temperature above 100° C.; treating the thus heated cryolite with water at a temperature below the boiling point thereof so as to dissolve at least a portion of the sodium sulfate originally contained in said cryolite; and substantially separating the cryolite of thus reduced sodium sulfate content from said treating water.

5. A method for removing from cryolite sodium sulfate bound thereto, comprising the steps of heating substantially dry sodium sulfate-containing cryolite to a temperature above 100° C.; forming of the thus heated cryolite and water an aqueous suspension at a temperature below the boiling point thereof so as to dissolve at least a portion of the sodium sulfate originally contained in said cryolite; and substantially separating said suspension into solid cryolite of thus reduced sodium sulfate content and into a sodium sulfate-containing liquid.

6. A method for removing from cryolite sodium sulfate bound thereto, comprising the steps of heating substantially dry sodium sulfate-containing cryolite to a temperature between about 180 and 220° C.; forming of the thus heated cryolite and water an aqueous suspension at a temperature below the boiling point thereof so as to dissolve at least a portion of the sodium sulfate originally contained in said cryolite; and substantially separating said suspension into solid cryolite of thus reduced sodium sulfate content and into a sodium sulfate-containing liquid.

7. A method for removing from cryolite sodium sulfate bound thereto, comprising the steps of forming an intimate mixture of subdivided solid sodium sulfate-containing cryolite and a liquid consisting substantially of water; heating said mixture to a temperature of above 100° C., thereby increasing the solubility of said bound sodium sulfate in water so as to dissolve at least a portion thereof in said liquid; and substantially separating cryolite of thus reduced sodium sulfate content from the thus formed aqueous solution of sodium sulfate.

8. A method for removing from cryolite sodium sulfate bound thereto, comprising the steps of forming an intimate mixture of subdivided solid sodium sulfate-containing cryolite and a liquid consisting substantially of water; heating said mixture to a temperature of between about 180 and 220° C., while maintaining a pressure sufficiently high to prevent boiling of said liquid, thereby increasing the solubility of said bound sodium sulfate in water so as to dissolve at least a portion thereof in said liquid; and substantially separating cryolite of thus reduced sodium sulfate content from the thus formed aqueous solution of sodium sulfate.

9. A method for removing from cryolite sodium sulfate bound thereto, comprising the steps of forming an intimate mixture of about equal quantities by weight of subdivided solid sodium sulfate-containing cryolite and of a liquid consisting substantially of water; heating said mixture to a temperature of between about 180 and 220° C., while maintaining a pressure sufficiently high to prevent boiling of said liquid, thereby increasing the solubility of said bound sodium sulfate in water so as to dissolve at least a portion thereof in said liquid; allowing said mixture to cool to a temperature below the boiling point of said liquid at ambient pressure; and substantially separating cryolite of thus reduced sodium sulfate content from the thus formed aqueous solution of sodium sulfate.

10. A method of removing sodium sulfate from cryolite containing in excess of 0.5% by weight of the same, comprising the steps of heating said sodium sulfate-containing cryolite to a temperatue above 100° C. thereby increasing the solubility of the sodium sulfate contained in said cryolite; and treating said cryolite with water so as to dissolve a portion of the sulfate content thereof sufficient to reduce the residual sodium sulfate content of said cryolite to a proportion not exceeding 0.5%.

11. A method for removing sodium sulfate from cryolite containing same in proportion up to 10%, which comprises the steps of heating an aqueous suspension of said sodium sulfate-containing cryolite to a temperature between 180° and 220° C. under agitation, filtering and washing with water, whereby most of said sodium sulfate is removed.

12. The method according to claim 11, wherein said suspension of cryolite is washed with water prior to heating to 180°–220° C.

13. The method according to claim 11, wherein said suspension has a concentration of up to 500 grams of cryolite per liter.

14. The method according to claim 11, wherein said aqueous suspension of sodium sulfate-containing cryolite is heated under pressure, and then washed with water of temperature 60° C.

References Cited by the Examiner
UNITED STATES PATENTS

| | | | |
|---|---|---|---|
| 2,687,341 | 8/54 | Mockrin | 23—88 |
| 2,788,257 | 4/57 | Duke | 23—31 X |
| 3,051,548 | 8/62 | Wilson | 23—89 |

OTHER REFERENCES

Seidell: "Solubilities of Inorganic and Organic Compounds," 2nd edition, Van Nostrand Co., 1919, p. 667.

NORMAN YUDKOFF, *Primary Examiner.*